United States Patent [19]

Virupaksha

[11] 4,024,358

[45] May 17, 1977

[54] ADAPTIVE ECHO CANCELLER USING DIFFERENTIAL PULSE CODE MODULATION ENCODING

[75] Inventor: Krishnamoorthy Virupaksha, Brookeville, Md.

[73] Assignee: Communications Satellite Corporation (Comsat), Washington, D.C.

[22] Filed: Oct. 31, 1975

[21] Appl. No.: 627,809

[52] U.S. Cl. ............................................ 179/170.6
[51] Int. Cl.$^2$ .......................................... H04B 3/20
[58] Field of Search .......... 333/18 R; 178/68, 69 R; 325/42, 45, 52; 179/1 P, 170.2, 170.4, 170.6, 170.8

[56] References Cited
UNITED STATES PATENTS

| | | | |
|---|---|---|---|
| 3,784,747 | 1/1974 | Berkely et al. | 179/1 P |
| 3,922,505 | 11/1975 | Hoge | 179/170.2 |
| 3,937,907 | 2/1976 | Campanella et al. | 179/170.6 |

Primary Examiner—Benedict V. Safourek
Attorney, Agent, or Firm—Sughrue, Rothwell, Mion, Zinn & Macpeak

[57] ABSTRACT

An echo canceller having a digital transversal filter with an adaptive control loop for achieving minimum echo is disclosed. Minimum echo is attained by subtracting a synthesized echo from the real echo, the synthesized echo being formed in a digital transversal filter by multiplying a stored replica of the impulse response times the incoming signal. The stored replica is updated using the steepest descent technique by adjusting each of the stages of the replica memory a given amount. The incoming signal is differential pulse code modulation encoded to reduce the process complexity and the size of the memories which store the replica and the incoming signals or, alternatively, increase the performance of the canceller.

4 Claims, 2 Drawing Figures

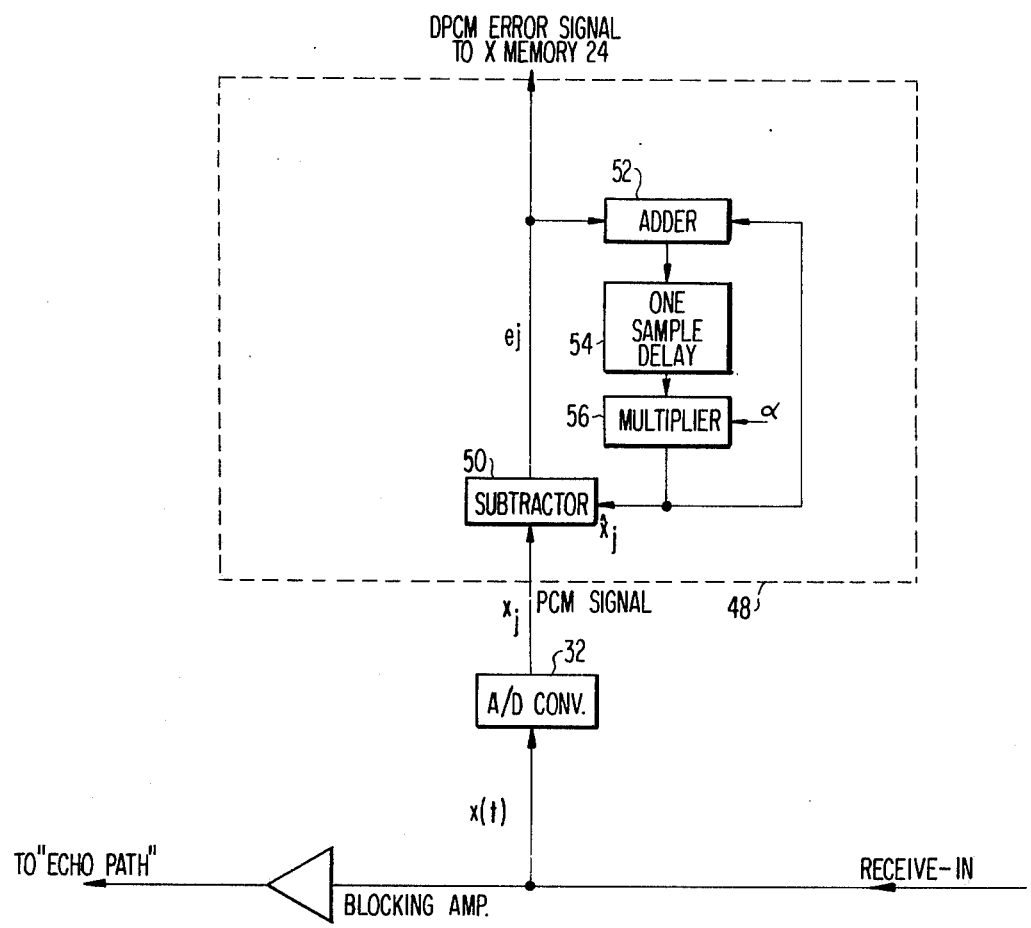

ADAPTIVE ECHO CANCELLER USING DIFFERENTIAL PULSE CODE MODULATION ENCODING

BACKGROUND OF THE INVENTION

The invention is in the field of echo cancellers and in particular is an improved echo canceller.

It is well known that hybrid circuits connecting two wire to four wire circuits do not provide echo free coupling between the receive and send lines of the four wire circuit. A portion of the signal, typically voice signals, on the receive line will pass to the send line and appear as an echo signal. When the four wire system is used for long distance communications, such as via a submarine cable or a communications satellite, the echo signal can be particularly disturbing.

Echo suppressors are commonly used for removing the echo caused by imperfection in the hybrid or other echo path by attenuating the send line signal. One class of such suppressors operates to interrupt the send line whenever a voice level signal is detected on the receive line. This will eliminate echo but will also eliminate voice signals emanating from the local two wire circuit and therefore clip the outgoing conversation. A double talk detector is conventionally used to reduce interruption of the send line, normally caused by voice signals on the receive line, when voice signals are simultaneously emanating from the two wire circuits, i.e., speakers at both ends are talking simultaneously. However, if the speaker at the local two wire circuit is speaking softly relative to the speaker at the far end, the larger voice signal on the receive line may prevent operation of the double talk detector and thus the send line will be interrupted thereby clipping the speech on the send line. When the double talk detector does operate correctly, the echo will not be prevented during double talk, but is transmitted along with the near talker speech.

A newer class of devices for handling the echo problem is known as echo cancellers. An echo canceller does not interrupt the send line but generates an approximation, $\hat{y}(t)$, of the echo, $y(t)$, and subtracts the former from the signal appearing on the send line. The remaining signal on the send line during double talk is $S(t) + \epsilon(t)$, where $S(t)$ is the local voice signal and $\epsilon(t)$ is the residual error caused by $\hat{y}(t)$ not being exactly equal to $y(t)$.

The basis of operation of echo cancellers is that the echo path may be regarded as a filter and satisfies the relation:

$$y(t) = \int_0^\infty f(t - \tau) k(\tau) d\tau,$$

where $f(t)$ is the signal applied to the echo path, $k(\tau)$ is the impulse response of the echo path, and $\hat{y}(t)$ is the echo.

In one particular implementation of the above equation, digital circuits are used. An X memory stores digitized samples of the incoming signal $X(t)$ over a period T, and an H register stores a digital representation of the impulse response of the echo path. Both memories recirculate, but the oldest sample in the X memory is replaced each sample period by a new sample of the signal $X(t)$. Digital convolution is performed on the contents of the two memories, i.e., the contents are multiplied, sample by sample, and the products are summed resulting in an approximation, $\hat{y}(t)$, of the echo. In one case, the impulse response of the echo path is stored in the H memory by using the search or interrogating pulse technique. That is, after the circuit is set up between caller and called stations, but before conversation begins, an artificial search or interrogating pulse is applied to the receiving line. The pulse passes through the echo path, and the resultant signal on the send line is the impulse response of the echo path. The impulse response is sampled over the period T, digitized and stored in the H register.

For a number of reasons, including the fact that the impulse response of the echo path will not be constant, the search pulse technique is not satisfactory. More recent cancellers continuously compute an impulse response that minimizes the mean squared error between $y(t)$ and $\hat{y}(t)$. The computation circuitry includes an adaptive control loop, responsive to the residual error, $\epsilon(t)$, and the receive side signal $x(t)$, for implementing the steepest-descent technique by adjusting the N samples of the H memory through incrementing or decrementing each sample by a given amount. After convergence, i.e., attainment of minimum error or echo, the contents of the H memory represent, in digital form, the impulse response of the echo path. The time of convergence and amplitude of residual echo, $\epsilon(t)$, are important characteristics in any canceller.

The adaptive control loop consists of a cross correlator and a corrector circuit. The cross correlator consists of two threshold detectors and a sign product generator. One threshold detector, with threshold $\Delta 1$, determines if each of the samples of the receive side signal, $x_t$, which are stored in an X memory, exceeds $\Delta 1$, and if so, determines its sign. The second threshold detector, with threshold $\Delta 2$, determines if the residual echo, $\epsilon(t)$, exceeds $\Delta 2$, and subsequently determines its sign. The sign product of $\epsilon(t)$ and $x_t$ is then used to direct an adder of the corrector circuit to add or subtract a single bit, $h$, from each of the corresponding H word contents of the memory.

SUMMARY OF THE INVENTION

The invention is an echo canceller of the above-described type in which an improvement is added to obtain a reduction in process complexity and the size of the memories which hold the present digitized speech samples and the replica of the impulse response of the echo path. This is accomplished by using a differential pulse code modulation as a source encoding technique which makes use of the redundancy present in the incoming speech signal. The speech signal thus processed may be used as an input signal in the echo path model of an echo canceller. This results in a reduction in process complexity and the size of the X and H memories. More specifically, where the pulse code modulated output of the analog to digital converter which digitizes the incoming signal comprises $n+1$ bits per sample, the differential pulse code modulation encoding technique according to the invention produces $n$ bits per sample. This reduction in the number of bits per sample is accomplished with no reduction in performance of the echo canceller. Alternatively, the same number of bits per sample can be used with a corresponding increase in performance.

BRIEF DESCRIPTION OF THE DRAWINGS

FIG. 2 is a block diagram of a preferred embodiment of the improvement described herein. The logic illustrated provides a differential pulse code modulation encoding of the digitized incoming speech signal as an input to the transversal filter.

DETAILED DESCRIPTION OF THE DRAWINGS

Figure 1:
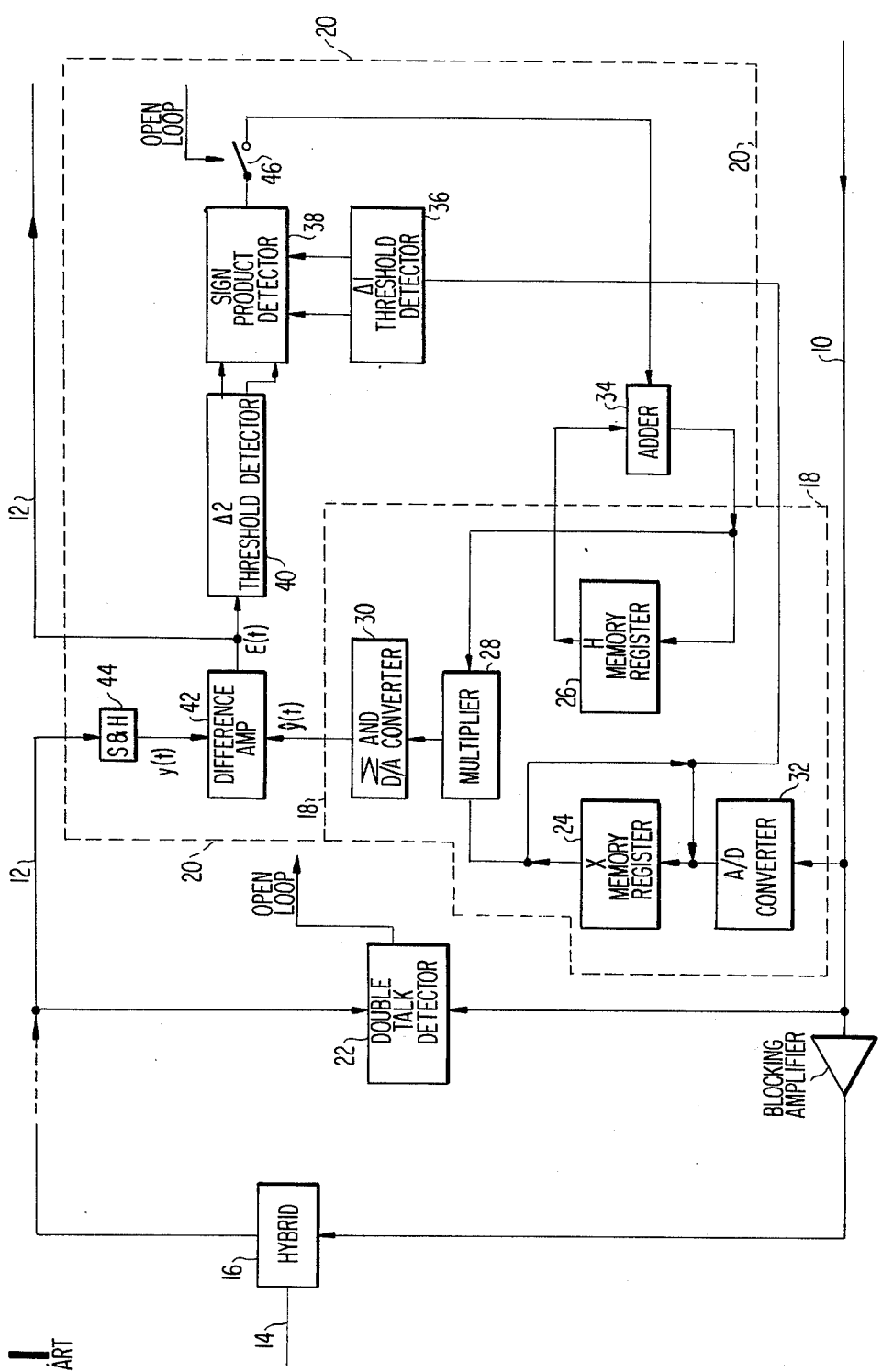
FIG. 1 is a block diagram of a prior art echo canceller.

The block diagram shown in FIG. 1 represents an echo canceller of the prior art type. The four wire circuit comprising receive line 10 and send line 12 is connected to the two wire circuit 14 by a hybrid circuit 16. The echo path is defined as that path from the receive-out side via hybrid 16 to the send-in side of the echo canceller. The two major components of the canceller are a digital transversal filter 18 and an adaptive control loop 20.

The digital transversal filter, 18, comprises an analog to digital converter 32 which samples the incoming signal $X(t)$ at the Nyquist rate and converts each sample into an $(n+1)$-bit word, an X memory register which stores N samples of $X(t)$, $x_1$ through $x_N$, and recirculates once each sample period, an H memory register which stores N digital words, $h_1$ through $h_N$, a multiplier 28 which multiplies X and H register words, stage for stage, and a summation circuit and digital to analog converter 30, for summing the multiplier output over the sample period. The output of the summation circuit and digital to analog converter 30, is an approximation $\hat{y}(t)$ of the echo $y(t)$.

The H memory 26 is initially $h_i = 0$ for $i=1,2,3,...N$. Digital convergence is provided by the adaptive control loop, 20, which comprises: a sample and hold circuit 44, for sampling the echo $y(t)$, appearing on the send line 12; a difference amplifier 42 for receiving $y(t)$ and $\hat{y}(t)$ and deriving the residual echo, $\epsilon(t)$; a $\Delta 2$ threshold circuit, 40, for determining if $|\epsilon(t)|$ is above a minimum amplitude $\Delta 2$ and for providing an output indicating the sign of $\epsilon(t)$ when $|\epsilon(t)|$ exceeds the threshold; a $\Delta 1$ threshold circuit 36 for detecting if $|x_i|$ exceeds the threshold $\Delta 1$ and for providing an indication of the sign of $x_i$ when the threshold is exceeded; a sign product detector, 38, for providing an output indicative of the sign product of $x_i$ and $\epsilon(t)$; an adder, 34, for adding or subtracting an incremental amount, $\Delta h_i$, to the sample $h_i$ to form the new sample $h_i^* = h_i \pm \Delta h_i$.

In order to prevent the adaptive control loop from responding to $S(t) + \epsilon(t)$, which will occur when $S(t)$ and $X(t)$ occur simultaneously, a conventional double talk detector 22 may be used. The detector 22 is not used in the conventional manner to interrupt the send line, but is used to open the adaptive control loop as indicated generally at 46. It will be noted that when the adaptive control loop 20 is opened, the signal $\hat{y}(t)$ continues to be subtracted from $S(t) + y(t)$, however, the H memory is not updated.

The echo canceller just described uses a pulse code modulated signal in the X memory. For equal performance according to the invention, the number of bits that need to be used for each stored sample in the X memory of an echo canceller using a differential pulse code modulation error signal will be less than that for pulse code modulated signals. Alternatively, the same memory size can be retained as in the conventional echo canceller, and a corresponding increase in performance can be realized by use of the invention. Moreover, an important feature of the invention is no reconstruction of the differential pulse code modulation error signals in the echo path is required, contrary to prior art differential pulse code encoding techniques. Since there is no reconstruction of the differential pulse code modulation error signals in the echo path model, the improvement of the subject invention is realized by simply implementing the differential pulse code modulation encoder 18 shown in FIG. 2. The encoder 48 receives the pulse code modulation (PCM) signal from the analog to digital converter 32 and supplies a differential pulse code modulation (DPCM) error signal to the X Memory register 24. More specifically, the analog to digital converter 32 samples the incoming speech signal $x(t)$ to produce the sampled sequence $\{x_j\}$. The DPCM error signal sequence $\{e_j\}$ is obtained at the output of subtractor 50 which computes the difference between the sampled sequence $\{x_j\}$ and a sequence $\{\hat{x}_j\}$ of estimated values for $\{x_j\}$. The sequence $\{\hat{x}_j\}$ is computed by adding the past DPCM error signal sequence $\{e_{j-1}\}$ and the past sequence $\{\hat{x}_{j-1}\}$ in adder 52, delaying the sum one sample period in delay device 54, and multiplying the delayed sum by a constant $\alpha < 1$ in multiplier 56. The constant $\alpha$ is the adjacent sample correlation coefficient, and for speech sampled at 8KH$_z$, has a value of 0.875.

The theory of the operation of the encoding technique according to the invention will now be explained.

The actual echo path memory function in discrete form is represented by $$a = [a_1, a_2, \ldots, a_N] \tag{1}$$

where N is the number of sample points. The simulated echo path memory function at the $j$-th iteration is represented by the row vector $$h^j = [h_1^j, h_2^j, \ldots, h_N^j] \tag{2}$$

The input sequence on the receive side is defined in general as $$x_1, x_2, x_3, \ldots$$

The input sequences involved in the $j$-th iteration in attempts to estimate $h^j$ are row vectors $$X_j = [x_j, x_{j-1}, \ldots, x_{j+1-N}] \tag{3}$$

and $$E_j = [e_j, e_{j-1}, \ldots, e_{j+1-N}] \tag{4}$$

where $$e_j = x_j - \hat{x}_j \tag{5}$$

$$\hat{x}_j = \alpha(e_{j-1} + \hat{x}_{j-1}) \tag{6}$$

and $$E_j = X_j - \alpha X_{j-1} \quad j = 1, 2, \ldots \tag{7}$$

$$x_j, \hat{x}_j, e_j = 0 \quad \text{for} \quad j = 0, -1, -2, \ldots$$

At the time of the $j$-th iteration, the error $\epsilon_j$ between the signal $y_j$ appearing at the output of the echo path and the value of the signal $\hat{Y}_j$ at the output of the simulated echo path is $$\epsilon_j = Y_j - \hat{Y}_j \qquad (8)$$

The information contained in this equation is used to update the values $h_i^j$ in order to minimize $\epsilon_j$. Using the analysis presented by Campanella et al in "Analysis of an Adaptive Impulse Response Echo Canceller", *COMSAT Technical Review*, vol. 2, no. 1, Spring 1972, it can be shown that the final solution for the incrementing vector $\Delta h^j$ for updating the $h_i^j$ coefficients is $$\Delta h^j = \frac{E_j \epsilon_j}{\sum_{i=1}^{N} e_{j+1-i}^2} \qquad (9)$$

This method of updating the H memory may be considered to be a special case of convergence by the method of steepest descent.

The procedure illustrated by Campenella et al is followed to derive the steepest descent method. Let us consider a positive even function, $\phi$, of the error signal, $\epsilon$, such that $$\frac{d\Phi(\epsilon)}{d\epsilon} = \Phi_\epsilon(\epsilon) \qquad (10)$$

is monotonically non-decreasing function, and $d\phi(\epsilon)/d\epsilon \geq 0$. These properties ensure convergence of the process. For steepest descent, the incrementing vector, $\Delta h^j$, must be proportional to the negative gradient of the function $\phi$ with respect to the coefficients $h_i^j$. Thus, $$\Delta h^j = -C \; \text{grad}_h \; \phi(\epsilon_j)$$

$$= -C \; \text{grad}_h \; \phi\{X_j a^T - E_j [h^j]^T\}$$

where $$E_j = X_j - \alpha X_{j-1}$$

$$= -C \; E_j \phi_\epsilon \{X_j a^T - E_j [h^j]^T\}$$

$$= C \; E_j \; \phi_\epsilon (\epsilon_j) \qquad (11)$$

Now, by letting $C = (E_j E^T)^{-1}$ and $\phi(\epsilon_j) = \epsilon_j$, we obtain Equation (9). The updating equation can alternately be written as $$h^{j+1} = h^j + C \; E_j \; \phi \; (\epsilon_j) \qquad (12)$$

where $C > 0$ and $\phi(\epsilon)$ satisfies Equation (10).

Equation (9) or (11) is approximated in the following form for the convergence algorithm used in the simulation of the echo canceller under discussion:

$$\Delta h^{j+1} = \nu \; \phi \; (\epsilon_j) \; \phi_\epsilon (e_j)$$

where $$\phi_\epsilon(\epsilon_j) = \begin{cases} -1, & -\epsilon_j < -\Delta\epsilon \\ 0, & -\Delta\epsilon \leq \epsilon_j \leq \Delta\epsilon \\ +1, & \epsilon_j > \Delta\epsilon \end{cases}$$

$$\phi_e(e_j) = \begin{cases} -1, & e_j < \Delta e \\ 0, & -\Delta e \leq e_j \leq \Delta e \\ +1, & e_j > \Delta e \end{cases}$$

and $\nu$ = size of the correction increment = 1, 2, or 4.

This establishes the convergence and cancellation part of echo cancellers using a DPCM error signal in the X memory.

Now an expression will be derived which relates the correction size $\Delta h^j_{PCM}$ to the correction size $\Delta h^j_{DPCM}$ for a given error signal $\epsilon_j$.

$\Delta h^j_{PCM}$ is given Campanella et al as follows:

$$\Delta h^j_{PCM} = \frac{X_j \epsilon_j}{\sum_{i=1}^{N} x_{j+1-i}^2} = \frac{X_j \epsilon_j}{N \sigma_x^2}$$

where $\sigma_x^2 = 1/N \sum_{i=1}^{N} x_{j+1-i}^2 = E\{x_j^2\}$ assuming $E\{x_j\} = 0$.

$\Delta h^j_{DPCM}$ is given by Equation (9):

$$\Delta h^j_{DPCM} = \frac{E_j \; \epsilon_j}{\sum_{i=1}^{N} e_{j+1-i}^2}$$

$$= \frac{(X_j - \alpha X_{j-1})}{N(1 - \alpha^2) \sigma_x^2} \epsilon_j$$

where $$\frac{1}{N} \sum_{i=1}^{N} e_{j+1-i}^2 = E\{e_j^2\} = (1 - \alpha^2)\sigma_x^2$$

and $$E_j = X_j - \alpha X_{j-1}$$

$$\Delta h^j_{DPCM} = \frac{X_j \epsilon_j}{N(1 - \alpha^2)\sigma_x^2} - \alpha \frac{X_{j-1}}{N(1 - \alpha^2)\sigma_x^2} \epsilon_j$$

$$= \frac{1}{(1 - \alpha^2)} \left[ \Delta h^j_{PCM} - \frac{\alpha X_{j-1} \epsilon_{j-1} (\epsilon_j/\epsilon_{j-1})}{N \sigma_x^2} \right]$$

$$\approx \frac{1}{(1 - \alpha^2)} [\Delta h^j_{PCM} - \gamma_j \alpha \; \Delta h^{j-1}_{PCM}]$$

where $$\gamma_j = \frac{\epsilon_j}{\epsilon_{j-1}}$$

Therefore, $$\Delta h^j_{DPCM} \approx \frac{1}{(1 - \alpha^2)} [\Delta h^j_{PCM} - \alpha \; \gamma_j \; \Delta h^{j-1}_{PCM}] \ldots$$

With respect to saving of bits in X memory, it is known that, for one tap prediction, the standard deviation of the DPCM error signal with speech input is only one half of the standard deviation of the input signal. Therefore, if a PCM signal uses $(n + 1)$ bits to represent its value then DPCM error signal will use only $n$ bits.

While one form of the improvement in adaptive echo canceller has been illustrated and described, it will be apparent to those skilled in the art that the embodiment shown is only exemplary and that various modifications can be made in construction and arrangement within the scope of the invention as defined in the appended claims.

What is claimed is:

1. In an echo canceller of the type having, a transversal filter means for performing convolution of an input signal on a received line and a replica of the impulse response of an echo path to generate an approximation of an echo signal for subtraction from a real echo signal on a send line, and an adaptive control loop responsive to the residual echo resulting from said subtraction and to stored samples of said input signal for incrementally varying said replica to reduce said residual echo, said transversal filter comprising means for sampling said input signal and converting each sample to an $(n+1)$-bit digital word, means to store a plurality of $n$-bit digital words corresponding to samples of said input signal and means for replacing the $n$-bit digital word corresponding to the oldest sample with an $n$-bit digital word corresponding to each new sample, said adaptive control loop comprising means for varying elements of said replica only in response to said residual echo and said individual stored samples being greater than threshold levels, the improvement comprising, differential pulse code modulation encoding means connected between said sampling means and said means for storing digital words corresponding to samples of said input signals for encoding said $(n+1)$-bit digital words as $n$-bit digital words as a function of the difference between said $(n+1)$-bit digital words and computed estimates of said $(n+1)$-bit digital words based on the redundancy present in said input signal.

2. An echo canceller as claimed in claim 1, wherein said differential pulse code modulation encoding means comprises, arithmetic means for computing said estimates for said $(n+1)$-bit digital words, and subtractor means responsive to said sampling means and said arithmetic means for generating said $n$-bit digital words as the difference between said $(n+1)$-bit digital words and said computed estimates of said $(n+1)$-bit digital words.

3. An echo canceller as claimed in claim 2, wherein said arithmetic means comprises, means for adding word by word said $n$-bit digital words with past computed estimates of said $(n+1)$-bit digital words.

4. An echo canceller as claimed in claim 3, wherein said arithmetic means further comprises, means for multiplying the sum of said $n$-bit digital words and said past computed estimates of said $(n+1)$-bit digital words by the adjacent sample correlation coefficient.

* * * * *

UNITED STATES PATENT OFFICE
CERTIFICATE OF CORRECTION

Patent No. 4,024,358  Dated May 17, 1977

Inventor(s) Krishnamoorthy Virupaksha

It is certified that error appears in the above-identified patent and that said Letters Patent are hereby corrected as shown below:

Col. 1, line 44, after "proximation" delete "y(t)" first occurrence insert $--\hat{y}(t)--$ line 57, delete "$\hat{y}(t)$" insert --y(t)--

Col. 5, equation (9) delete "$c^2_{j+1-i}$" insert $--e^2_{j+1-i}--$ equation (10), the denominator should read $--d\varepsilon--$ instead of "$d_\varepsilon$"

line 28, delete "$d\phi$" insert $--d\phi_\varepsilon--$ line 44, delete "$\phi$" insert $--\phi_\varepsilon--$ equation (12), should read:
   $$--h^{j+1} = h^j + C\ E_j\ \phi_\varepsilon(\varepsilon_j) \qquad (12) --$$

UNITED STATES PATENT OFFICE
CERTIFICATE OF CORRECTION

Patent No. 4,024,358          Dated May 17, 1977

Inventor(s) Krishnamoorthy Virupaksha

It is certified that error appears in the above-identified patent and that said Letters Patent are hereby corrected as shown below:

line 50, delete "$\phi$" insert --$\phi_\varepsilon$-- line 55, delete in its entirety and insert:

$$\Delta h^{j+1} = \eta \, \phi_\varepsilon(\varepsilon_j) \, \phi_e(e_j)$$

line 68, delete "$\nu$ = size" insert --$\eta$ = size--

Signed and Sealed this

Thirteenth Day of September 1977

[SEAL]

Attest:

RUTH C. MASON
*Attesting Officer*

LUTRELLE F. PARKER
*Acting Commissioner of Patents and Trademarks*